J. C. PICKELS.
Car Spring.
No. 6,321. Reissued March 9, 1875.
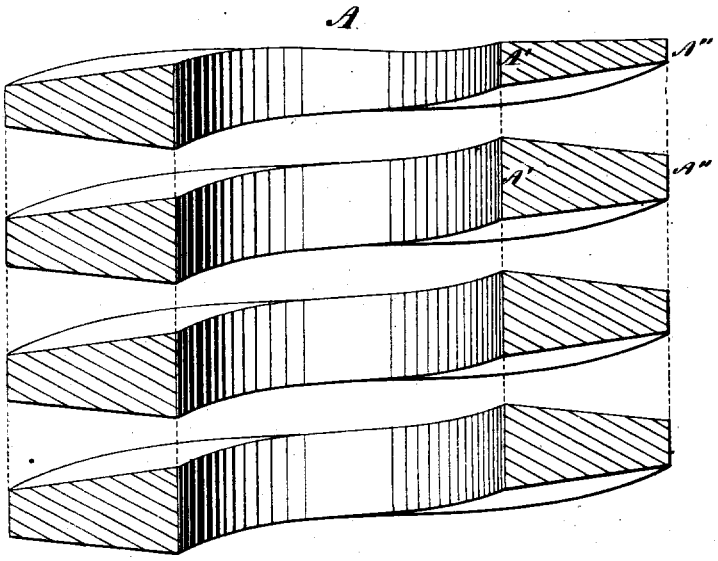
Witnesses
Jos. B. Connolly
A. A. Connolly
Inventor
James C. Pickels
By Connolly Bros.
Attorneys
THE GRAPHIC CO. PHOTO-LITH. 39 & 41 PARK PLACE, N.Y.

UNITED STATES PATENT OFFICE.

JAMES C. PICKLES, OF WILMINGTON, DELAWARE, ASSIGNOR OF ONE-HALF INTEREST TO JAMES P. HAYES.

IMPROVEMENT IN CAR-SPRINGS.

Specification forming part of Letters Patent No. 152,864, dated July 7, 1874; reissue No. 6,321, dated March 9, 1875; application filed October 17, 1874.

*To all whom it may concern:*

Be it known that I, JAMES C. PICKLES, of Wilmington, county of New Castle, State of Delaware, have invented a Car-Spring, of which the following is a specification:

My invention has for its object to produce a car-spring, which shall combine in an eminent degree the qualities of lightness, strength, and elasticity.

My invention accordingly consists, broadly, of a single spiral spring made from a bar of metal rolled on its edge, said bar being of varying thickness in transverse section.

In the accompanying drawing is represented a vertical central or transverse section of a spring constructed according to my plan, said spring—A, for example—being formed with its inner edge A′ of greater vertical thickness than its outer edge A″, thus illustrating practically the essential idea of the invention.

In forming the spring I take a plate or bar of metal of requisite form and roll it into the shape of a coil around a mandrel.

I do not claim, broadly, as my invention, an edge-rolled spiral spring, the same being of common use; but

I claim—

1. A coiled edge-rolled spring, the inner edge of which is of greater vertical thickness than the outer edge, substantially as set forth.

2. An edge-rolled spiral spring, composed of a single metallic bar of varying thickness in transverse section, substantially as set forth.

3. An edge-rolled spiral spring, having one edge of greater vertical thickness than the other, substantially as set forth.

In testimony that I claim the foregoing I have hereunto set my hand this 15th day of October, A. D. 1874.

JAMES C. PICKELS.

Witnesses:
JNO. H. PUHL,
WM. W. PRITCHETT.